GEORGE W. WRIGHT
INVENTOR.

BY Edmund W.E. Kamm
ATTORNEY

June 28, 1960 G. W. WRIGHT 2,942,759
DISPENSER CONTROL MECHANISM
Filed Oct. 17, 1958 6 Sheets-Sheet 2

GEORGE W. WRIGHT
*INVENTORS*

BY *Edmund W. E. Kamm*
ATTORNEY

June 28, 1960 G. W. WRIGHT 2,942,759
DISPENSER CONTROL MECHANISM
Filed Oct. 17, 1958 6 Sheets-Sheet 3

GEORGE W. WRIGHT
INVENTOR.

BY Edmund W.E. Kamm
ATTORNEY

GEORGE W. WRIGHT
INVENTOR.

BY Edmund W. Kamm
ATTORNEY

June 28, 1960  G. W. WRIGHT  2,942,759
DISPENSER CONTROL MECHANISM
Filed Oct. 17, 1958  6 Sheets-Sheet 5

GEORGE W. WRIGHT
*INVENTOR.*

BY Edmund W. E. Kamm
ATTORNEY

June 28, 1960   G. W. WRIGHT   2,942,759
DISPENSER CONTROL MECHANISM
Filed Oct. 17, 1958   6 Sheets-Sheet 6
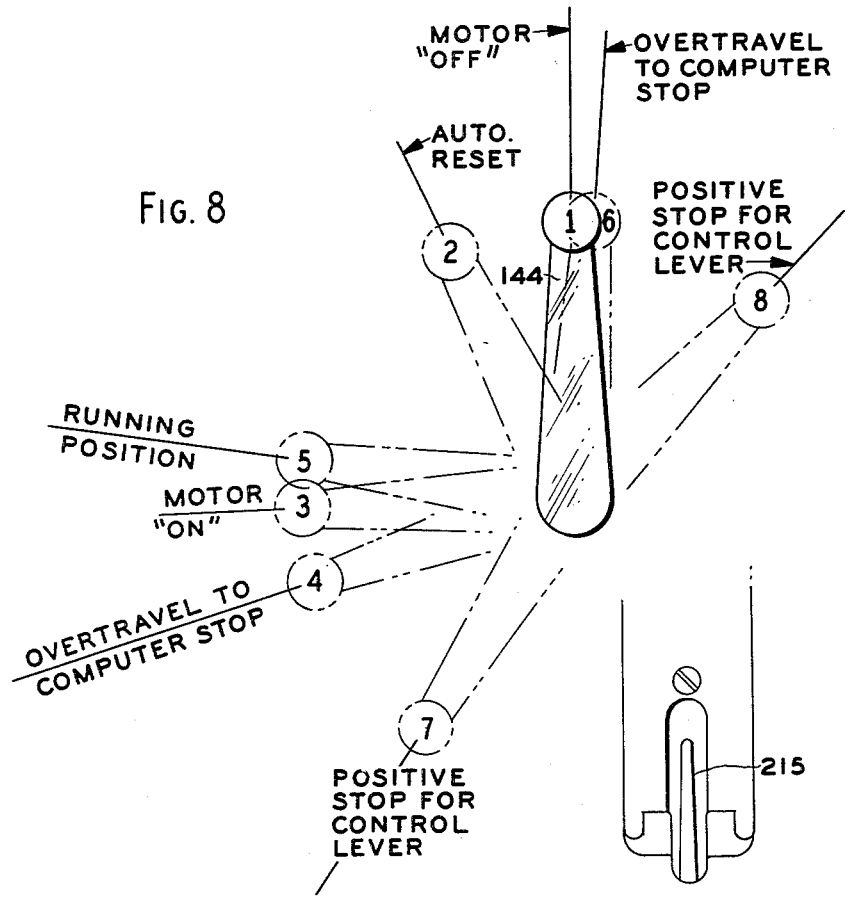
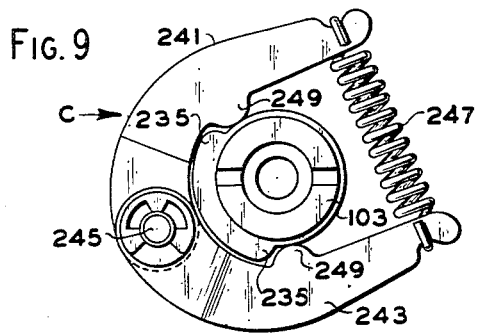
GEORGE W. WRIGHT
*INVENTOR.*
BY Edmund W.E. Kamm
ATTORNEY

United States Patent Office 2,942,759
Patented June 28, 1960

2,942,759
DISPENSER CONTROL MECHANISM

George W. Wright, Yoder, Ind., assignor to Tokheim Corporation, Fort Wayne, Ind., a corporation of Indiana Filed Oct. 17, 1958, Ser. No. 767,846

20 Claims. (Cl. 222—34)

This invention relates to an improvement in dispensing control mechanisms for fuel dispensers. Such dispensers normally include a meter and a resettable register which is driven by the meter and which is intended to register the fluid dispensed in any delivery transaction. In order that this may occur, it is necessary that the register be reset to zero after one delivery has been terminated and before a subsequent delivery can be started.

The Patent Number 2,814,444, issued to H. N. Bliss, November 26, 1957, discloses the general form of the register which is in common use. The patent also discloses a switch control mechanism associated therewith for preventing restarting the pump motor, after it has been stopped, without resetting the registers. In dispensers or dispensing systems in which more than one meter is served by one pump, it is also necessary to provide valve mean, associated with each meter, for preventing the flow of liquid to the meter until the register driven by the meter has been reset, as well as a switch for controlling the pump.

It is an object of this invention to provide a nozzle support mechanism which is operable in time with the dispensing control mechanism so that the latter mechanism cannot be operated so long as the dispensing nozzle is on its support and so that the nozzle cannot be hung on the support until the mechanism is in a phase of its cycle in which resetting has already occurred or in which it must occur before the dispenser can be started.

It is a further object to provide a mechanism which includes a single lever for actuating the dispensing control mechanism, including the switch and/or valves and for actuating the nozzle support in timed relation therewith.

Another object of the invention is to provide a novel retractable nozzle support and a mechanism for actuating it.

These and other objects will become apparent from a study of this specification and the drawings which are attached hereto, made a part hereof and in which:

Figure 8 is a diagrammatic view showing the various events of the cycle correlated with the positions of the operating lever.

Figure 9 is a front elevation of the overload clutch.

GENERAL DISPENSER STRUCTURE

Figure 1:
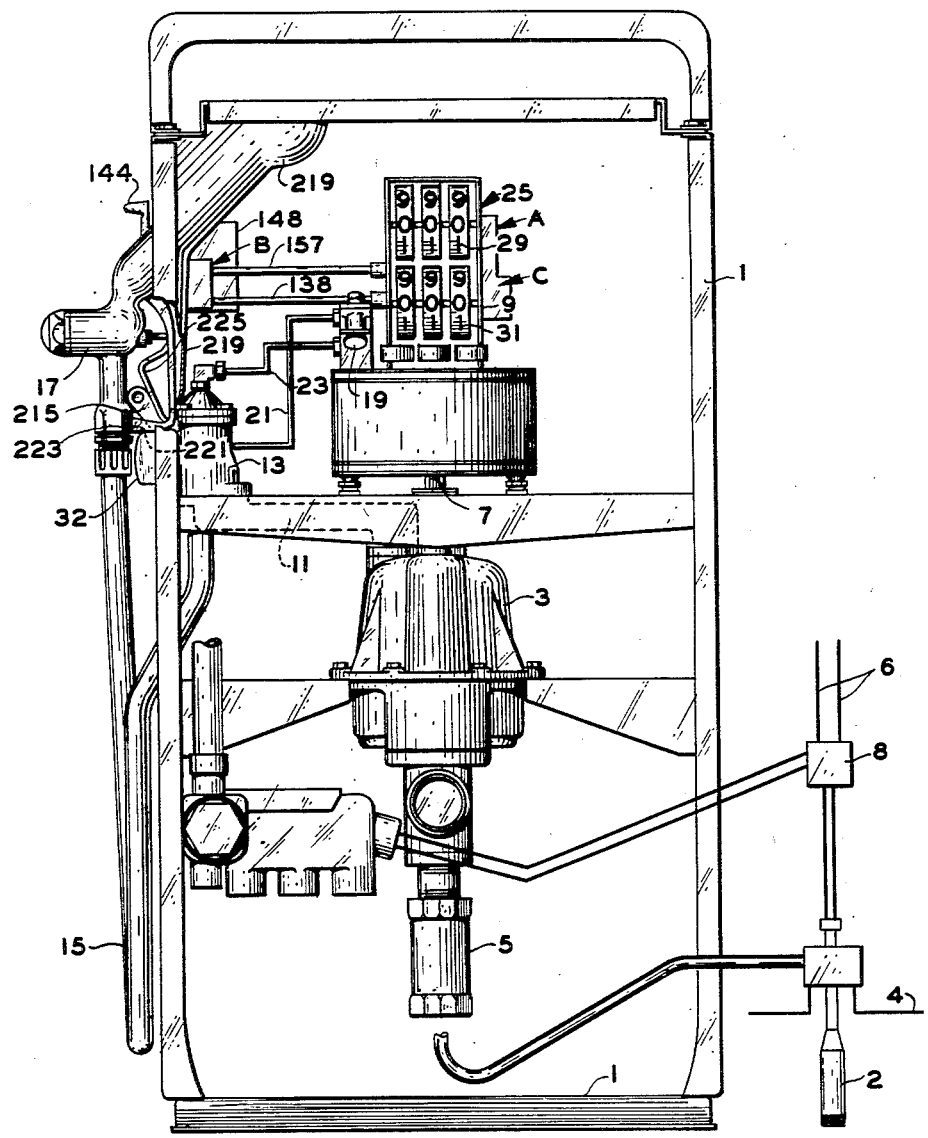
Figure 1 is an elevation of a dispenser of the remote controlled type.

Referring to Figure 1, numeral 1 indicates the dispenser frame in which is mounted a meter 3 which receives liquid under pressure from a remotely located motor driven pump such as 2 which is submerged in tank 4, by way of the inlet connection 5. The meter is connected by shaft 7 to drive the register 9 which is here shown to be a computing register.

Measured liquid discharged from the meter is conducted by pipe 11 to a motor operated control valve 13. A hose 15 having a valved nozzle 17 is attached to the discharge port 12 of said valve.

A pilot valve 19 is mounted on the register and is connected by tubes 21, 23 to control the motor of the control valve.

Obviously, if desired, a motor and pump together with the usual air separator may be installed in the frame to provide an integrated unit, the remote pump being, of course, eliminated.

REGISTER RESETTING MECHANISM

Figure 2:
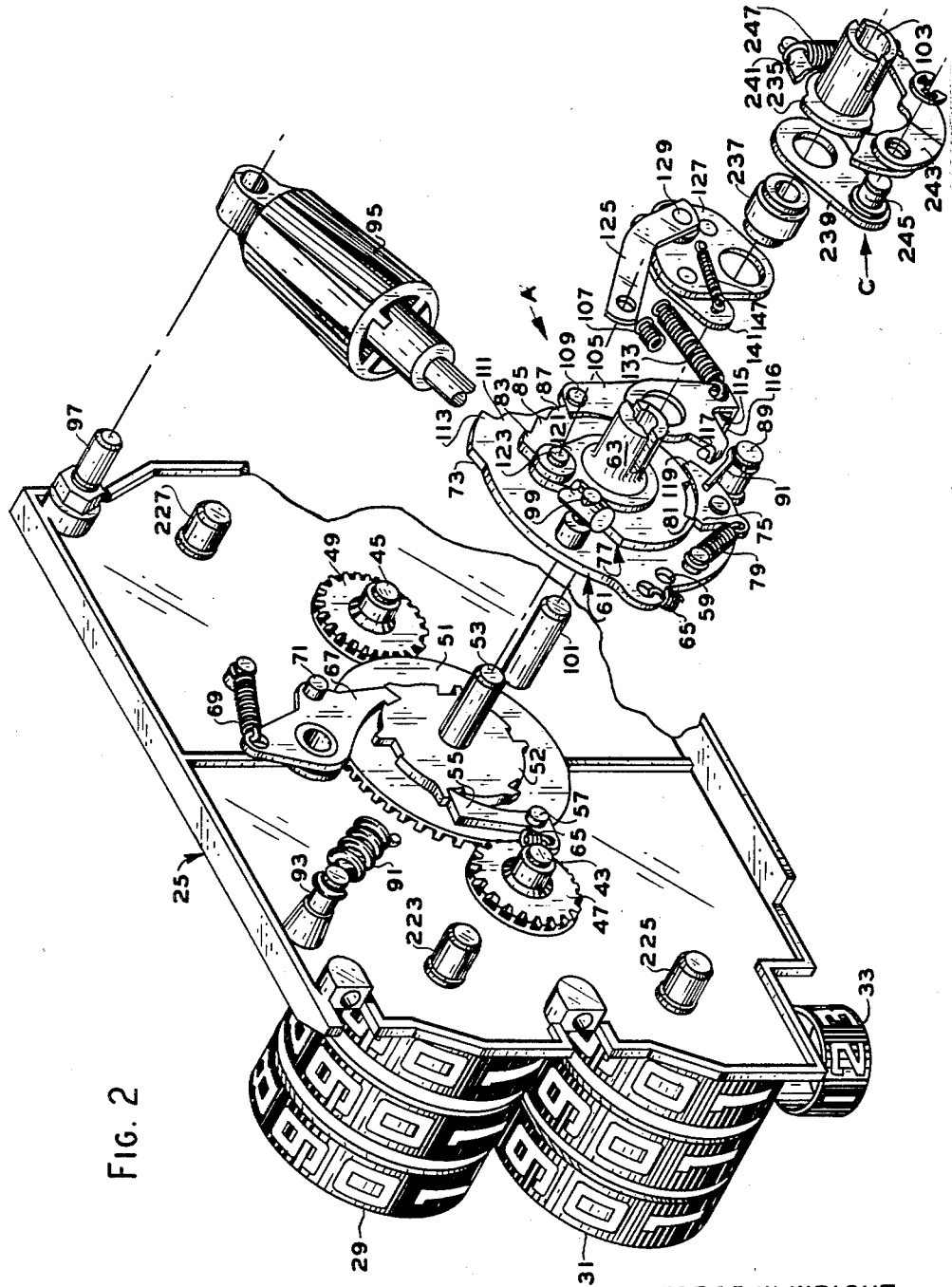
Figure 2 is an exploded view of the register resetting and interlock mechanism.

Referring to Figures 1 and 2, the register resetting mechanism is indicated generally by the arrow B. The computing register 9 comprises a frame indicated generally by 25 having cost register 29, gallons register 31 and unit price indicators 33.

The registers 29 and 31 must be reset to zero prior to each transaction.

To effect such resetting, the register must be declutched from the meter and clutched to the resetting mechanism set forth below.

Shafts 43 and 45 (Fig. 2) are resetting shafts. The former is connected by suitable gearing and clutches to the two registers 29, 31 while shaft 45 is similarly connected to two like registers on the opposite side which are not shown.

Gears 47, 49 are fixed to the respective shafts and are driven by gear 51 and ratchet 52 which are integral and which are rotatably mounted on shaft 53.

The ratchet is driven by a pawl 55 which is pivotally mounted on a pin 57 which is fixed in the opening 59 of resetting member 61. A spring 65 is connected between the pawl and member and urges the pawl into engagement with the ratchet.

The resetting member is rotatably mounted on a hub 63 which is fixed to shaft 53. A pawl 67 is pivotally mounted on the frame and is urged into engagement with the ratchet by spring 69 to prevent reverse rotation of the ratchet. A pin 71 extends from the pawl into the path of cam 73 on member 61 and is actuated thereby to disengage pawl 67 from the ratchet after the resetting spring 91 has been recocked or loaded.

Resetting member 61 also has pivotally mounted on it, a latching pawl or dog 75 which is urged into contact with the edge of the control element 77, which is fixed to and rotates with hub 63, by means of a spring 79. The dog is adapted to engage a tooth 81 formed by notching the edge of element 77. The edge of the control element opposite the notch is provided with a series of spaced interlock teeth 83, 85 and 87.

Resetting member 61 has a spring anchor pin 89 fixed to it which extends axially past dog 75 and the resetting spring 91 is supported at one end on pin 89 and at the other end on a pin 93 fixed to the frame.

A dashpot 95 is pivotally mounted on a frame pin 97 and its plunger is connected to another pin or journal 99 fixed to and projecting axially from the resetting member and serves to slow the rotation of the member under action of spring 91.

A second shaft 101 is mounted in frame 25 in parallel spaced relation with respect to shaft 53. Both shafts extend entirely through the register and project from the opposite side.

A hub 103 is fixedly mounted on the shaft 101 (Figs. 2 and 9) and is formed with a pair of stops 235.

A wrist plate or actuator 127 is fixed to one end of a sleeve 237 which is rotatably mounted on the shaft 101 and an arm 239 is fixed to the other end of the sleeve and projects radially therefrom adjacent the hub. The overload clutch, indicated generally by the arrow C in Figures 1, 2 and 9, comprises two complementary clutch pawls 241, 243 which are pivotally mounted on a common pin 245 which is fixed in the end of the arm. The pawls extend from the pin past opposite sides of the hub so as to span it, and the free ends of the pawls are connected by a spring 247. Each pawl carries a rounded detent 249 which is adapted to engage the adjacent stop 235 in a manner to normally transmit motion from the hub, through either stop 235 to the associated pawl and consequently through arm 239 and sleeve 237 to the wristplate, without appreciable lost motion.

However, should an excessive torque be applied to the shaft 101 at any time, the pawls will spread against the restraint of the spring and permit the shaft to turn without effect.

An interlock pawl 105 is pivotally mounted on the shaft 101 and is urged into engagement with the teeth 83, 85, 87 by a spring 107. A pin 109 is fixed in the upper end of the pawl 105 extends into the path of a cam 111 and a stop 113 formed on the edge of the resetting member 61.

Figure 3:
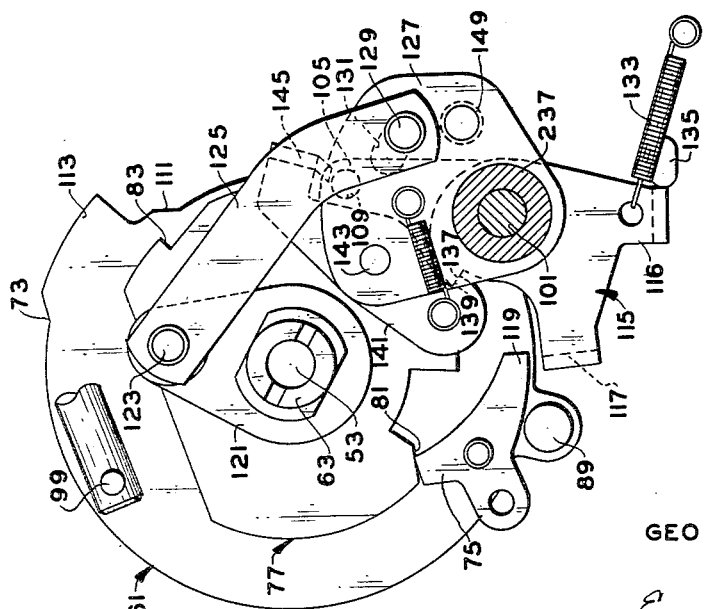
Figure 3 is a front elevation of part of the mechanism shown in Figure 2.

A trip lever 115 is rotatably mounted on a portion of sleeve 237 which extends beyond the wrist plate 127 and has an arm provided with an ear 117 which is adapted to engage the end 119 of the dog 75 as the lever is rotated clockwise (Fig. 2) and serves to rotate the dog counterclockwise out of engagement with tooth 81. Lever 115 is normally held in the position shown, away from the dog, by a spring 133 which acts on arm 116 to hold it against a fixed stop 135 (Fig. 3).

The hub 63 has a lever 121 fixed to it, which carries a pin 123 upon which is pivotally mounted one end of a link 125. The other end of the link has a pin 129 which enters an elongated arcuate slot 131 in the wrist plate or actuator 127 which is fixed to sleeve 237 as described above. The pin and slot provide a lost motion connection between the link and wrist plate so that the latter may be moved through a predetermined arc without moving lever 121 which is of course latched against such movement by pawl 105 and tooth 87.

A hook pawl 141 is pivotally mounted at 143 on the wrist plate, and has, on one end, a bent over ear 145 which is disposed in the path of stop 113 and on the other end, the pawl carries a tooth 139 which is adapted to engage a tooth 137 on the trip lever 115 and is used in this direction by spring 147.

*Operation*

In general the mechanism just described operates as follows:

With the parts in the positions shown in Figures 2 and 3, the shaft 101 is rotated clockwise and, through the overload clutch, moves the wrist plate to the extent permitted by the pin 129 and slot 131, lever 121 being latched by pawl 105 and tooth 87 as described.

This action is transmitted to lever 115 through pawl 141, and causes ear 117 to rotate dog 75 from engagement with tooth 81, so as to free the resetting element 61 from the control element 77, so that 61 will be rotated clockwise by spring 91. Since latch pawl pin 71 is initially on cam 73, latch pawl 67 is thus held free of ratchet 52 and since the register indicators are clutched to shafts 43, 45, the described rotation of element 61 will cause pawl 55 to rotate the ratchet 52, gears 51, 49, 47, shafts 43, 45 and the associated gears and register indicators to the zero position.

At the end of this movement of element 61, pawl 67 will have been restored to hold the ratchet 52 against reverse rotation, cam 111 will have moved pawl 105 out of engagement with tooth 87, stop 113 will have acted on ear 145 of hook pawl 141 to release teeth 139, 137 so that lever 115 will be returned to its stop 135 by spring 133 and stop 113 will have engaged pin 109 to limit the rotation of member 61.

Shaft 53, being thus freed of restraint by pawl 105 and tooth 87, is free to rotate clockwise and will be so rotated by the mechanism described below to effect the following functions:

(1) Declutch the register indicators from the resetting mechanism and clutch them to the meter shaft 7.

(2) Close the motor switch 181 which actuates a controller 8 to connect motor pump 2 to the main 6.

(3) Open the valve 19 which in turn opens the delivery valve 13.

(4) Position tooth 81 ahead of dog 75 so that upon reverse rotation of element 77, the dog will be picked up.

Upon termination of the dispensing operation, shaft 53 and control element 77 will be rotated counterclockwise to perform the following functions:

(1) Cause tooth 81 to pick up dog 75 and thereafter rotate element 61 in the counterclockwise direction to load spring 91.

(2) This rotation of 61 also frees hook pawl 141 from stop 113.

(3) Cam 111 frees pawl 105 for successive engagement with teeth 83, 85 and 87.

(4) Near the end of rotation, cam 73 lifts pawl 67 from ratchet 52.

(5) Lever 121 rotates wrist plate 127 and spring 147 will cause the hook pawl tooth 139 to reengage tooth 137.

(6) The register indicators are declutched from meter shaft 7 and clutched to the reset shafts.

(7) The switch is opened and the valves 19 and 13 are closed.

Thus the parts are restored to their initial condition. The teeth 83 and 85 coact with pawl 105 to prevent reverse operation of hub 63 and the associated parts until the initial position has been reached so as to insure that once the switch and valves have been opened and closed, respectively, they cannot be closed and opened again without resetting the register.

PILOT AND CONTROL VALVES

Figure 4:
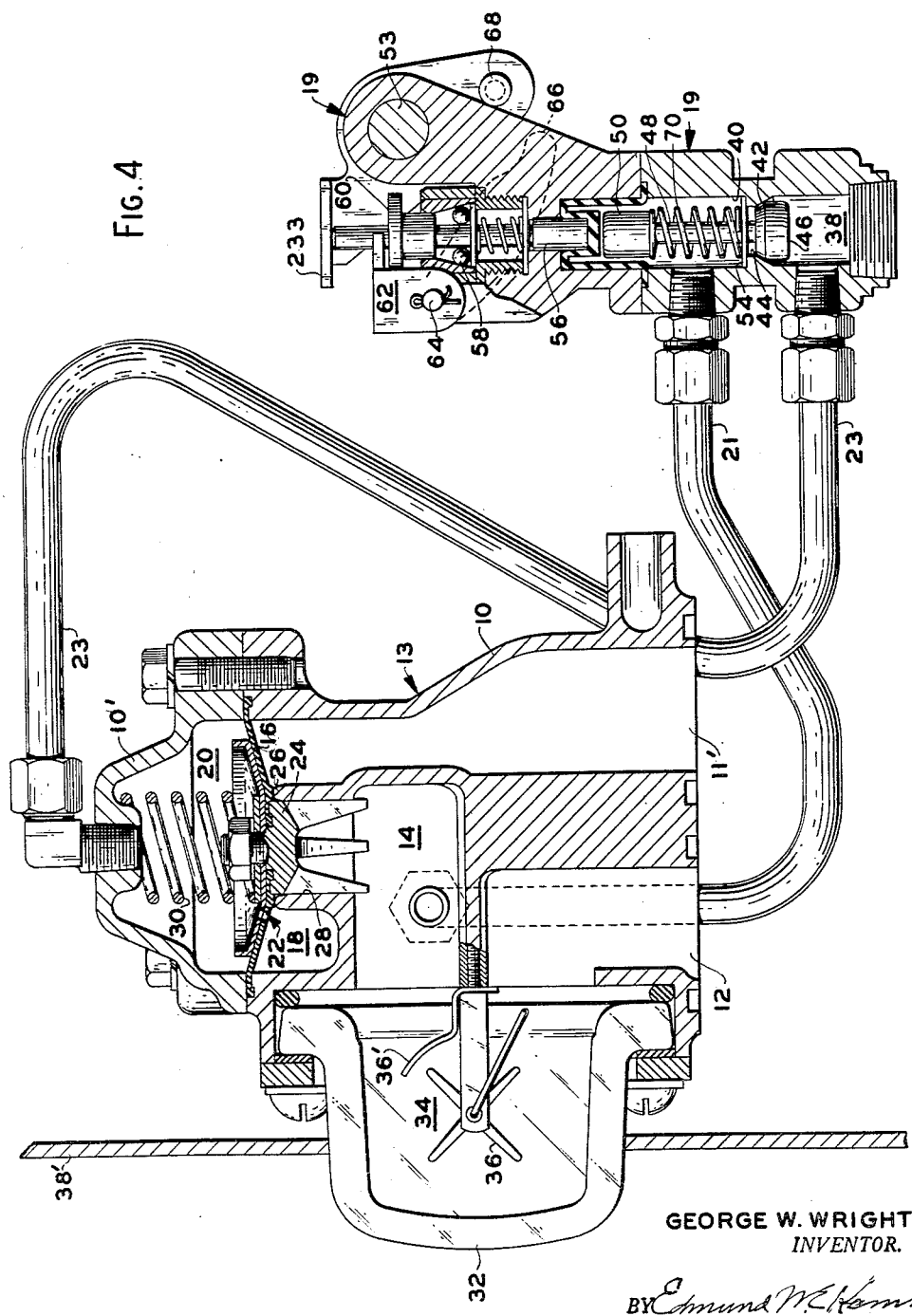
Figure 4 is an elevation with parts in section showing the pilot and control valves which are used with a remote controlled dispenser.

Referring to Figure 4 which shows the general structure of the pilot valve 19 and control valve 13, the numeral 10 indicates the control valve body which defines an inlet 11' which communicates with the meter discharge pipe 11, and 12 indicates the outlet conduit which communicates with the hose 15. The body also defines a discharge chamber 14.

A diaphragm 16 defines, with the valve body 10 and its cap 10', a pressure chamber 18 which is directly connected with inlet 11' and a control chamber 20 which communicates with chamber 18 through a restricted orifice 22.

A valve 24 is mounted on the diaphragm and is normally urged toward a seat 26 which defines a port 28 connecting the pressure and discharge chambers, by a spring 30.

The discharge chamber 14 is connected with the chamber 34 defined by the body and sight glass 32 and this chamber communicates with outlet 12. Liquid flows, when the valve 24 is open, from 11' through 18, port 28, chamber 14, over baffle 36', through chamber 34 and outlet conduit 12 to hose 15. The spinner 36 is actuated by this flow.

The body of pilot valve 19 defines an inlet chamber 38, an outlet chamber 40, a seat 42 therebetween which defines a connecting port 44. A valve 46 is mounted in the inlet chamber and has a stem 48 extending through the port and terminating in a head 50. A spring 70 acts on a spring seat 54 and said head to urge the valve closed.

A plunger 56 is mounted in the body, to act on the head in a direction to open valve 46, is isolated from the discharge chamber 40 by a diaphragm and projects from the body so as to be acted upon by the lever 233 on shaft 53.

A ball clutch 58 is disposed to act on the plunger so as to hold the valve 46 open, once the plunger has been depressed. A clutch release collar 60 is telescopically mounted on the plunger and is adapted to be depressed by a lever 62 which is pivoted at 64 on the body and has a cam 66 extending in the path of a roller 68 mounted on the other end of lever 233.

The inlet chamber of the pilot valve is connected with the control chamber 20 of the control valve by tube 23 while the discharge chamber of the pilot valve is connected with the discharge chamber 14 of the control valve by tube 21.

In a motor pump type of dispenser having a single pump and two or more metered outlets, the hydraulic pilot and control valves just described would be retained. In other motor pump dispensers which have a motor pump for each hose outlet, the pilot valve 19, its operating connections with the reset mechanism, tubes 21, 23, valve 24, diaphragm 16, and spring 30 would be eliminated. The valve body 10 and its cap 101 with the control tube openings plugged, would be retained and would serve as a sight glass and an outlet fitting.

Further, should the sight glass 32, baffle 36' and spinner 36 not be required, these parts may be removed and a flanged metal cup, having a height about half that of glass 32 may be substituted. This cup will lie within the housing panel 38' which would in such case be imperforate at that point.

Thus the body, including the cap 10' may act merely as an outlet fitting, or it may be equipped to act additionally as a flow indicator, a control valve or both.

*Operation*

When shaft 53 is operated as described herein, in the clockwise direction (Figure 2), which is the counterclockwise direction in Figure 4, lever 233 will at the proper time depress the plunger 56 to open the pilot valve 46.

As described below, the pump is energized substantially at the same time that the pilot valve is opened and if the nozzle valve remains closed, as it usually does, the pressures in chambers 14, 18, 20, 38 and 40 will all be equalized by reason of the orifice 22. Consequently, valve 24 will remain closed because of spring 30. As soon as the nozzle valve is opened, the pressure in chamber 14 will drop rapidly and since this chamber communicates directly with the control chamber 20 by way of tubes 21, 23 and the pilot valve 46, the pressure in this chamber will also drop. Since the orifice 22 is restricted, sufficient fluid cannot pass therethrough to balance the pressures in chambers 18 and 20 so that the unbalance of pressures on the diaphragm opens the valve 24. The degree of opening of the valve 24 will vary with the degree of opening of the nozzle valve because this determines the pressure which will be established in chamber 20.

When the nozzle valve closes, the pressures in the three chambers become balanced and the spring 30 closes the valve 24.

It should be noted that in the counterclockwise rotation of lever 233 (Fig. 4), roller 68 passes over cam 66 and actuates lever 62 which in turn actuates the cam release collar without effect since the valve is already closed. However upon clockwise rotation of lever 233, which occurs at the termination of dispensing, the roller again passes over the cam and again actuates the lever 62 to depress the release collar and this time, since the valve is being held open by the clutch, the valve will be closed by its spring as soon as the clutch is released. This action occurs substantially at the same time that the motor switch opens.

SWITCH AND NOZZLE SUPPORT

Figure 6:
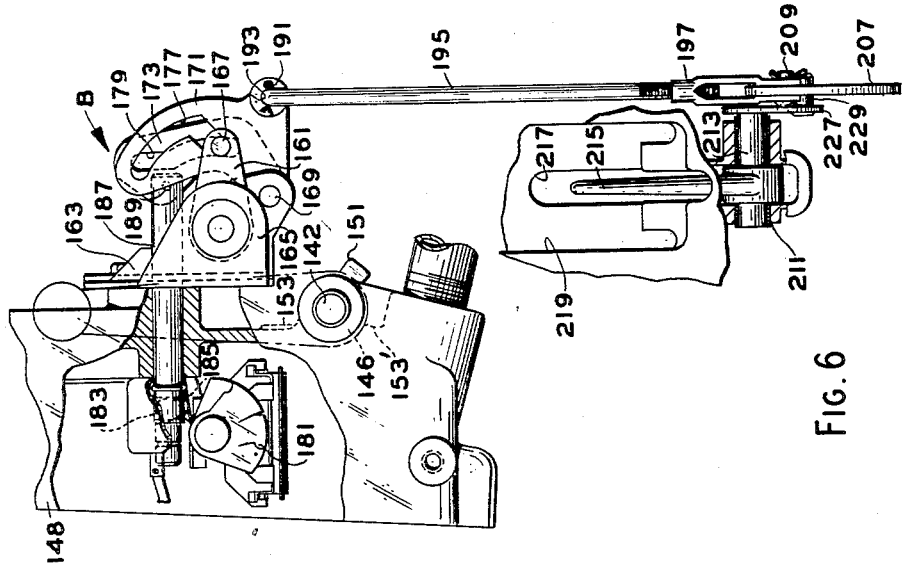
Figure 6 is a front elevation of the mechanism of Figure 5.
Figure 5:
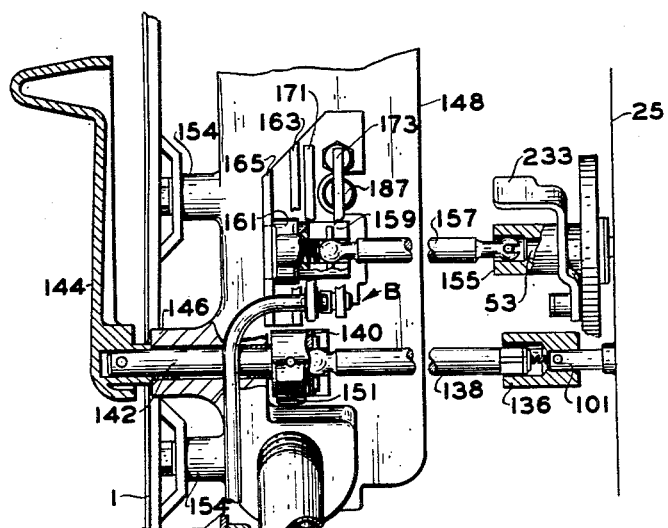
Figure 5 is a side elevation of the nozzle support, switch and pilot valve actuating mechanisms.
Figure 7:
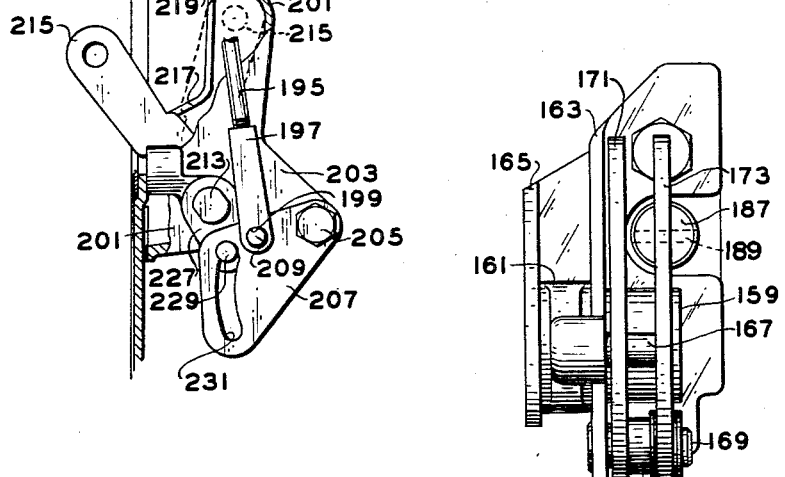
Figure 7 is an enlarged view of the upper portion of the structure of Figure 5.

In Figures 1, 5 and 6, the switch and nozzle support control mechanism is indicated generally by arrow B. The structure for operating the shafts 53 and 101 is shown in Figures 5, 6 and 7. In Figure 5, shaft 101 is connected by a coupling 136 to a shaft 138 which is in turn connected by another coupling 140 to the shaft 142 of the operating handle or lever 144. The shaft 142 is mounted for rotation in a bearing structure 146 of the switch box 148. The coupling 140 includes a radial lug 151 which is positioned so as to engage stop lugs 153, 153' (Fig. 6) on the switch box to limit the rotation of lever 144 in both directions. The switch box is suitably mounted on frame 1 at 154 (Fig. 5).

Shaft 53 is connected by coupling 155 to a shaft 157 which in turn drives a coupling 159 which forms a part of a lever 161 and which is journalled in two spaced brackets 163, 165 mounted on the switch box. The lever includes an axially extending pin 167.

As shown in Figures 6 and 7, a journal 169 is fixed in bracket 163 in parallel spaced relation to pin 167, and a nozzle support operating cam lever 171 and a switch operating cam lever 173 are pivotally mounted on the journal and are held in spaced relation by a spacer 175. The pin 167 passes through the cam slots 177 and 179 of the respective cam levers 171, 173 to actuate them as the lever 161 is rocked.

The motor switch 181 of the usual snap action type is operated by a toggle lever 183 which enters a recess 185 in one end of push rod 187. The other end of the rod is connected to cam lever 173 by a pin 189.

The cam lever 171 is provided with an arm 191 which is perforated at 193 to receive the bent end of a link 195. The other end of this link is provided with an adjustable yoke 197 which is perforated at 199.

As shown in Figures 5 and 6 particularly, a bracket 201 is suitably mounted on the frame 1 and has a projection 203 on which is pivotally mounted, by means of a shoulder screw 205, a cam lever 207. The yoke 197 is connected to this lever by pin 209.

The bracket also includes a bearing structure 211 (Fig. 6) in which is pivotally mounted the shaft 213. The nozzle support 215 is fastened to and projects radially from the shaft 213 through a slot 221 (Fig. 1) in the guard 223 of the nozzle. The support 215 also blocks the operation of the nozzle trigger 225 when the nozzle is on the support.

Shaft 213 also has fixed, to one end, a crank 227 which has an axially directed pin 229 adapted to enter the cam slot 231 of lever 207.

*Operation*

Assuming that the actuating handle or lever 144 is in the initial or starting position marked 1 in Figure 8, that the nozzle rests on the support 215 and that the registers indicate the amounts of the preceding transaction. In such case the motor switch is open and the pilot and control valves are closed.

To start a new delivery, the operator will first remove the nozzle from support 215 and will move lever 144 to the number 2 position, such motion being permitted by the lost motion pin and slot 129, 131. This rotation of the lever is transmitted through shaft 142 (Fig. 5) coupling 140, shaft 138, coupling 136, shaft 101, and the overload clutch to the wrist plate 127 which causes the tripping of the dog 75 and initiates resetting as described above. Further movement of the lever 144 is prevented by the tooth 87, pawl 105 and control element 77 which prevent further rotation of the shaft 101 until resetting is completed.

When pawl 105 frees control element 77, the lever may be moved to the number 4 or overtravel position. The lever is stopped in this position by contact between ear 117 of lever 115 and the edge of control plate 77, the lever 115 being driven to this position by pin 149 of the wrist plate. As the lever or handle 144 is so moved, the control element 77 is rotated clockwise (Figure 3), which in turn rotates shafts 53, 157 and lever 161 counterclockwise (Fig. 6).

The pin 167 riding in the cam slots 177, 179 first acts on lever 171 to rotate it counterclockwise to raise link 195. The link in turn rotates cam 207 clockwise (Fig. 5) and its cam slot 231 acts on pin 229 of crank 227 to rotate the crank, shaft 213 and the nozzle support 215 in a clockwise direction to the position shown in dashed lines in Figure 5 in which it cannot support the nozzle.

During the latter part of the rotation of arm 161 (Fig. 6), its pin engages the straight edge portion of the cam slot 179 and moves the cam 173 and plunger 187 to the left (Fig. 6) to rotate switch toggle lever 183 counterclockwise. Near the end of this movement, when the lever 144 is in about the number 3 position, switch 181 snaps to its closed position.

The pilot valve operating lever 233 will also open the pilot valve 46 substantially at the time the switch closes, to open the control valve 24 as described above.

Upon the release of lever 144, it will be returned to the position numbered 5 by spring 133 which returns the pawl lever 115 to the stop 135. This movement of the lever occurs with some corresponding movement of shaft 53 which is sufficient to lift the lever 233 from the pilot valve stem but the valve is held open by the clutch. The lost motion in the switch mechanism is sufficient to prevent the switch from opening. The movement is definitely limited by the engagement of tooth 81 with the latching dog 75. The dispenser is therefore in the normal running condition and the desired delivery can be made.

Upon completion of the delivery, lever 144 will be returned from position 5 through position 1 to an overtravel position 6. Shaft 101 will drive the actuator or wrist plate 127 counterclockwise (Figs. 2 and 3), which, through link 125 and lever 121, will drive control element 77 and shaft 53 in a like direction until tooth 83 is engaged by pawl 105.

Thereafter, upon further movement of these parts in the same direction, the cam 173, plunger 187, toggle lever 183 are moved further to overcome the lost motion in the switch whereupon it snaps open. Lever 233, roller 68, cam 66 and lever 62 release the clutch so as to close the pilot valve 46 substantially at the time that the switch opens and this will prevent the control valve 24 which closed in response to the closure of the hose nozzle, from reopening until after the register has been reset. Next the pawl 105 engages tooth 85. Before this occurs however it should be noted that once the switch and valves have opened and closed respectively, the pawl 105 and tooth 83 prevent lever 144 from again being rotated in the switch closing direction far enough to reverse the conditions of the switch and valves.

Accordingly, it is necessary that the lever be returned to its initial position before the dispenser can be restarted. As noted previously the spring 91 is loaded in the process and will return the handle 144 and tooth 87 from their overtravel position 6 to the initial position 1 when the lever is released. The overtravel position is determined by contact between the spring anchor 89 and the ear 117 (Fig. 3).

The lever 144 may be moved from the number 1 to the number 2 position without moving the nozzle support materially, such movement being permitted by the shape of the cam slots 177 and 231 of cams 171 and 207. The register may thus be reset with the nozzle on the support. If, however, it is attempted to move the lever beyond the number 2 position without removing the nozzle from the support, the guard 223 of the nozzle will be pinched between the nozzle support 215 which is tending to withdraw into slot 217 (Fig. 4) and the boot 219 and will block the operation of the mechanism connecting the support with the handle. Should undue force be applied to the handle in such case or at either overtravel position 4 or 6, one of the clutch pawls 243 will be forced away from its associated stop and will free shaft 101 and handle 144 for idle rotation without damage to the mechanism.

The same release will be effected if the lever is forced from the No. 2 toward the No. 3 position before the resetting of the register is completed. To reestablish the clutch in operating condition it is necessary merely to rotate the lever in a reverse direction until the pawl which has yielded reengages the corresponding stop.

The maximum limit positions which the lever 144 may assume, with the clutch released, are illustrated by the positions numbered 7 and 8 and are determined by contact of the projection 151 (Fig. 6) on coupling 140 with the stops 153 and 153' respectively.

It is obvious that various changes may be made in the form, structure and arrangement of parts of the specific embodiments of the invention disclosed herein for purposes of illustration, without departing from the spirit of the invention. Accordingly, applicants do not desire to be limited to such specific embodiments but desire protection falling fairly within the scope of the appended claims.

I claim:
1. In a control mechanism for a liquid dispenser which includes a resettable register adapted to register the liquid dispensed, register resetting means, including a rotatably mounted resetting member adapted to reset said register when the member is rotated in one direction, a spring connected to rotate said member in said direction, a rotatably mounted control element, releasable means for connecting said element to rotate said resetting member in a second direction to load said spring, means for latching said element in a spring loaded position, said resetting means including means, effective upon substantial completion of resetting, for releasing said latching means, the improvement which comprises a pivotally mounted actuator, a lost motion device connecting said actuator with said control element to move it in directions correlative with the direction of movement of said actuator, a handle, means including an overload clutch connecting said handle to drive said actuator, means operable with said actuator to release said connecting means in response to movement of said actuator in said first direction through the distance permitted by said lost motion device, said overload clutch serving to prevent the application of excessive force to said actuator.

2. The structure defined by claim 1, said overload clutch including yieldable means adapted to apply a predetermined torque to said actuator in either of said directions and to yield in response to a torque in excess of said predetermined torque applied by said handle in either of said directions.

3. The structure defined by claim 1 wherein said overload clutch includes a rotatable member having a pair of outwardly projecting circumferentially spaced detents, an arm mounted for rotation substantially coaxially with said member, a pair of latch pawls pivotally mounted on said arm, eccentrically thereof and extending on opposite sides of said member, detent means on each arm disposed for substantially simultaneous engagement with a corresponding one of said detents and yieldable means for urging said arms toward said member to hold said detents and detent means in engagement, said detents and detent means cooperating to transmit a predetermined torque between said member and arm in either direction.

4. The structure defined by claim 2 which includes fixed stops and a stop movable with said handle, said fixed stops being disposed to limit the rotation of said handle in either direction after said clutch has been released.

5. In a control mechanism for a liquid dispenser which includes a flow line terminating in a dispensing nozzle, a receptacle for the nozzle, a motor control switch, a resettable register adapted to register the liquid dispensed, register resetting means, including a rotatably mounted resetting member adapted to reset said register when the member is rotated in one direction, a spring for rotating said member in said direction, a rotatably mounted control element, releasable means for connecting said element to rotate said resetting member in a second direction to load said spring, means for latching said element in a spring loaded position, said resetting means including means, effective upon substantial completion of resetting for releasing said latching means, the improvement which comprises a pivotally mounted actuator, a lost motion device connecting said actuator with said control element to move it in directions correlative with the directon of movement of said actuator, a handle connected to drive said actuator, means operable with said actuator to release said connecting means in response to movement of said actuator in said first direction through the distance permitted by said lost motion device, a nozzle support mounted for movement to and from a position for supporting the nozzle in the receptacle, first means, operable with said control element and connected with said support, to move said support from nozzle supporting position upon initial movement of said control element after the release of said latching means, and second means, operable with said control element and connected with said switch, for thereafter closing said switch.

6. The structure defined by claim 5 in which said second means is operable with said control means when the latter rotates in said second direction, to open said switch and said first means is operable thereafter to restore said support to nozzle supporting position.

7. The structure defined by claim 5 wherein said nozzle support comprises an element mounted for movement between a first limit position in which it projects into said receptacle and a second limit position in which it is substantially withdrawn from said receptacle.

8. The structure defined by claim 5 wherein said nozzle support comprises a lever having a free end, means pivotally mounting said lever for movement between a position in which its free end projects into said receptacle a distance sufficient to support said dispensing nozzle and a position in which said end is withdrawn from the receptacle a distance sufficient to prevent it from supporting said nozzle.

9. The structure defined by claim 5 which includes a motor operated control valve in said flow line, a pilot valve connected with the motor of said control valve, said pilot valve, when open, serving to condition said motor to open said control valve and, when closed, causing said motor to close said control valve, and third means, operable with said control element, for opening and closing said pilot valve substantially simultaneously with the closing and opening respectively of said switch.

10. In a liquid dispensing apparatus, a motor pump control switch, a resettable register, actuatable means for resetting said register, a receptacle for receiving a dispensing nozzle, a nozzle support mounted for movement to and from nozzle supporting position in said receptacle, a handle mounted for movement in one direction from an initial position to a second position, means operable by said handle during said movement to actuate said resetting means, releasable latching means for restraining said handle against further movement in said direction, means responsive to the completion of resetting for releasing said latching means, first means connecting said handle for retracting said nozzle support during the early part of further movement of said handle in the same direction toward a third position, second means connecting said handle to close said switch substantially as said handle reaches said third position, means for returning said handle in an opposite direction to a running position intermediate second and third positions, said first and second means being constructed to hold said support retracted and said switch closed when said handle occupies said running position, said second means serving to open said switch as said handle is moved from said running toward said first position, said first means serving to move said support into nozzle supporting position as said lever approaches said first position and after said switch has been opened.

11. In a liquid dispensing apparatus, a motor pump control switch, a resettable register, actuatable means for resetting said register, a receptacle for receiving a dispensing nozzle, a nozzle support mounted for movement to and from supporting position in said receptacle, a handle mounted for movement in one direction from an initial position to a second position, means operable by said handle during said movement to actuate said resetting means, releasable latching means for restraining said handle against further movement in said direction, means responsive to the completion of resetting for releasing said latching means, first means connecting said handle for retracting said nozzle support during the early part of further movement of said handle in the same direction toward a third position, second means connecting said handle to close said switch substantially as said handle reaches said third position, means for stopping said handle in a fourth position beyond said third position, means for returning said handle in an opposite direction to a fifth position intermediate second and third positions, said first and second means being constructed to hold said support retracted and said switch closed while said handle is in said fifth position, said second means serving to open said switch as said handle is moved from said fifth toward said initial position, said first means serving to move said support into nozzle supporting position as said lever approaches said initial position and after said switch is opened, means for stopping said handle in a sixth position beyond said inital position, and means for restoring said handle to said initial position upon its release in said sixth positon.

12. In a liquid dispensing apparatus having a dispensing line including a hose terminating in a nozzle, a motor pump control switch, a resettable register, means for resetting said register, a receptacle for receiving the dispensing nozzle, a nozzle support mounted for movement to and retraction from a position to support said nozzle in said receptacle, a handle mounted for movement in one direction from an initial position, through a predetermined arc, in two stages, and for return in an opposite direction to said initial position, means connecting said handle to actuate said resetting means during the first stage of said movement, first means connecting said handle for retracting said nozzle support during the first part of said second stage of movement of said handle, second means connecting said handle to close said switch during the latter part of said second stage of movement, said second means serving to open said switch as said handle is moved toward said initial position, said first means serving to move said support into nozzle supporting position after said switch is open.

13. The structure defined by claim 12 which includes a motor operated valve in said dispensing line, means including a pilot valve which is adapted to open and close, to condition said motor operated valve to open and to cause it to close correspondingly as said pilot valve is opened and closed, and means operable by said handle for opening and closing said pilot valve substantantially simultaneously with the closing and opening respectively, of said switch.

14. The structure defined by claim 12 wherein said first connecting means includes a shaft connected for movement in opposite directions by said handle, a cam mechanism connected to be driven by said shaft and connected to actuate said nozzle support, said cam mechanism being constructed so as to actuate said support during the first part of the second stage movement in one direction and during the latter part of the movement in the opposite direction.

15. The structure defined by claim 12 wherein the return of said handle in the opposite direction occurs in two stages, and wherein said second connecting means includes a shaft connected for movement in opposite directions by said handle, a cam mechanism connected to be driven by said shaft, means including a lost motion device for connecting said cam mechanism to actuate said switch, said cam mechanism being constructed so as to actuate said device during the latter portion of the second stage movement in said one direction and during the early part of the second stage movement in said opposite direction, said lost motion device serving to delay the closing of the switch in response to said second stage movement in said one direction and to delay the opening of the switch in response to said second stage movement in the other direction.

16. The structure defined by claim 15 wherein said first connecting means comprises another cam mechanism connected to be driven by said shaft and connected to actuate said nozzle support, said other cam mechanism being constructed so as to actuate said support during the first part of the second stage movement in said one direction and during the latter part of the second stage movement in said opposite direction.

17. The structure defined by claim 16 wherein said cam mechanisms are constructed to hold said switch and support against movement for the remainder of the movement of said shaft in both directions.

18. The structure defined by claim 12 wherein said first and second connecting means include a crank connected for rotary movement in opposite directions by said handle, said crank having an axially extending pin, first and second cam levers pivotally mounted adjacent said crank for oscillation transversely of said pin, a cam slot in each lever adapted to receive said pin for actuation thereby as said crank moves, means connecting said first lever to actuate said switch and means connecting said second lever to actuate said nozzle support.

19. The structure defined by claim 18 wherein the cam slot in said first lever is shaped so as to actuate its connecting means during the latter portion of the movement in one direction and during the early portion of the reverse movement and the cam slot in the second lever is shaped so as to actuate its connecting means during the early part of the movement in said one direction and during the latter portion of the reverse movement whereby said nozzle support will be retracted before the switch is closed and will be restored after the switch is opened.

20. The structure defined by claim 14 wherein said means connecting said cam mechanism with said support includes a link actuated by said cam mechanism, a lever mounted for pivotal movement by said link, said lever having a cam slot, a crank connected to actuate said support and having its pin disposed in said cam slot, said slot being shaped so as to actuate said crank pin to retract said support during the early part of the movement of the link in one direction and to restore said support during the latter portion of the movement in the opposite direction.

References Cited in the file of this patent

UNITED STATES PATENTS

| | | |
|---|---|---|
| 2,026,959 | Bradley | Jan. 7, 1936 |
| 2,594,853 | Bliss | Apr. 29, 1952 |
| 2,626,082 | Bliss et al. | Jan. 20, 1953 |
| 2,660,335 | Bliss et al. | Nov. 24, 1953 |